A. E. ALLEN.
FIRE EXTINGUISHER.
APPLICATION FILED AUG. 27, 1914.
1,137,827. Patented May 4, 1915.
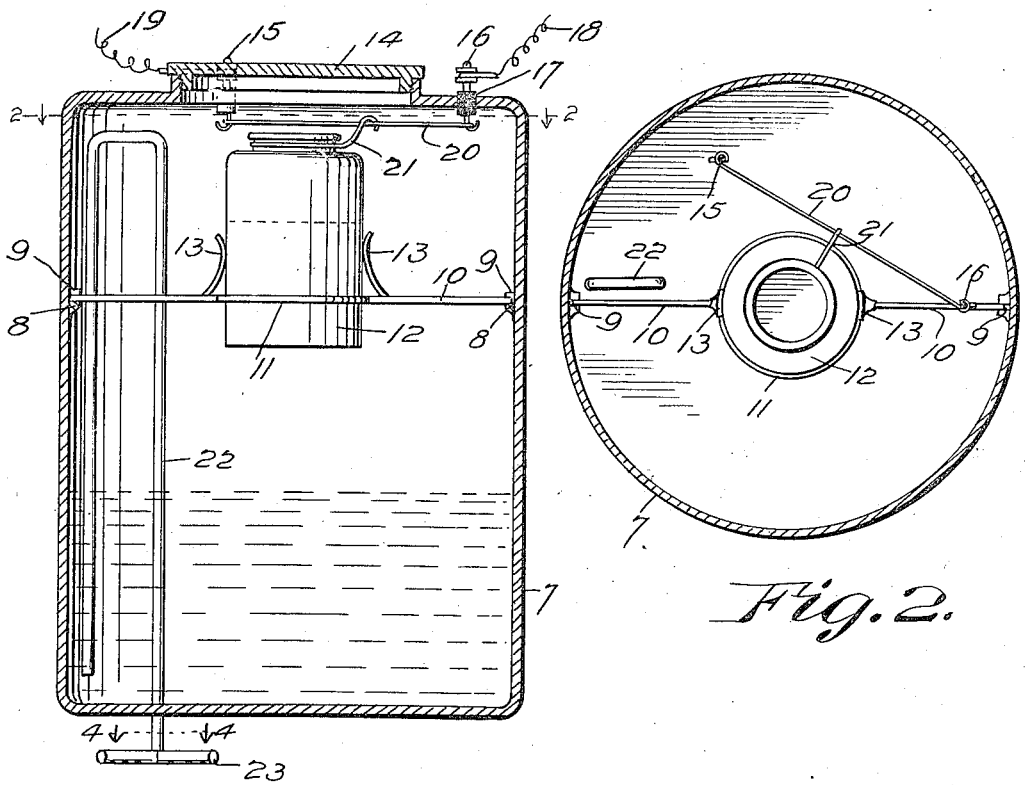
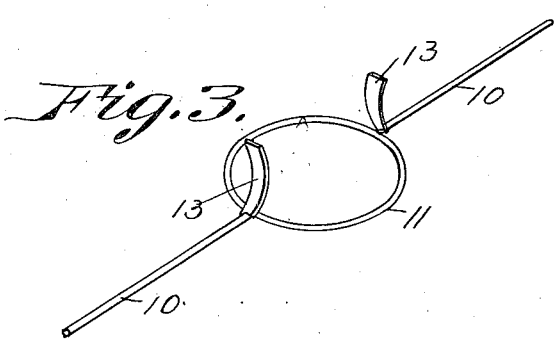
Witnesses
M. I. Pfeifer
L. E. Barkley
Inventor
Albert E. Allen,
by Franks Appleman,
Attorney

UNITED STATES PATENT OFFICE.

ALBERT E. ALLEN, OF SPIRIT LAKE, IOWA.

FIRE-EXTINGUISHER.

1,137,827.  Specification of Letters Patent.  Patented May 4, 1915.

Application filed August 27, 1914. Serial No. 858,919.

*To all whom it may concern:*

Be it known that I, ALBERT E. ALLEN, a citizen of the United States of America, and resident of Spirit Lake, in the county of Dickinson and State of Iowa, have invented certain new and useful Improvements in Fire-Extinguishers, of which the following is a specification.

This invention relates to fire extinguishers and particularly to an electrically controlled extinguisher, wherein the controlling agent is fused by a current of electricity, the said agent releasing a receptacle so that it will discharge its contents into a container of liquid which is so acted upon by the contents of the receptacle that the gas formed will create a pressure, which will prove effective to force the liquid from the container, so that it may be discharged upon the fire, it being the purpose of the inventor that the receptacle shall contain a chemical which will aid in forming a gas effective to quench or subdue a fire.

An object of the invention, therefore, is to provide novel means in a container for tiltingly supporting a receptacle and for holding the said receptacle in position to retain its contents until such time as the holding means releases the receptacle, and, as stated, this holding means is under the control of an electric current or is destroyed by said electric current, so that the receptacle may be tilted.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of a container with the receptacle and parts of the apparatus in elevation; Fig. 2 illustrates a sectional view on the line 2—2 of Fig. 1; Fig. 3 illustrates a perspective view of a receptacle supporting member; and Fig. 4 illustrates a sectional view on the line 4—4 of Fig. 1.

In these drawings 7 denotes a container for liquid, which liquid may be chemically treated and the internal wall of the container has lugs 8 recessed to form seats 9 in which the ends of a receptacle supporting yoke 10 rest and are rotatable. The yoke consists of two end rods and an intermediate loop 11, in which the receptacle 12 is inserted, the said receptacle being further held in place by means of the spring fingers 13 which extend from the loop 11 and engage the sides of the receptacle. As shown in the drawings, the receptacle has its major portion above the yoke so that it will be top heavy and when free to do so may cause the rotation of the yoke and consequently the inverting of the receptacle so that its contents may be discharged into the container for the purposes stated. The contents of the receptacle is preferably a chemically prepared liquid which, when mixed with the liquid of the container, will create a gas, insuring pressure which will cause the discharge of the contents of the container.

The container 7 at its top has a cover 14 and the said top furthermore has the terminals 15 and 16 extending through it, it being seen by reference to Fig. 1 that insulation 17 is interposed between a terminal and the container so that a current of electricity through the conductors 18 and 19 may not be short circuited by the container. The lower ends of the terminals 15 and 16 are hook-shaped and support a fuse 20 which may be destroyed when a current of electricity passes through the conductors. The purpose of the fuse is to act as a support for the receptacle 12 to hold it in upright position, as shown in Fig. 1 and to that end, the said receptacle has a hook 21 which partially embraces the fuse and the said hook has an extension encircling or partially encircling the neck of the receptacle. It follows, therefore, that when the fuse is destroyed, the receptacle will become inverted with the result stated.

As a means for distributing the contents of the container over a fire or burning material, a pipe 22 is placed in the container with the end thereof near the bottom, the said pipe extending upwardly to a point near the top, being then looped with a length or section extending downwardly through the bottom of the container and terminating in a sprinkling head 23, of any known type.

It is the purpose of the inventor to have the current thermostatically controlled and thereby cause the fire extinguisher to be self-operating and under the control of the heat from the fire which is to be quenched, it being understood that the circuit will be closed when the heat has reached a predetermined degree, thereby establishing the circuit, destroying the fuse, releasing the receptacle, and causing the discharge of a spray of liquid.

I claim—

1. In a fire extinguisher, a container having lugs on its internal wall, said lugs having seats, a yoke having its ends rotatable in the seats, a receptacle supported by the yoke, a fuse within the receptacle, means engaging the fuse and receptacle for holding the receptacle in an upright position, conductor terminals for supporting the fuse, conductors of electricity connected to the terminals, and a liquid discharge pipe leading from the container.

2. In a fire extinguisher, a container having bearing lugs on its inner wall, a yoke rotatably supported by the lugs, a receptacle for chemically prepared liquid supported by the yoke, terminals extending through the wall of the container, said terminals having hooks, a fuse supported by the hooks, a member engaging the receptacle and having a hook for engaging the fuse for holding the receptacle in an upright position, said receptacle being adapted to be inverted when released by the fuse, and a liquid discharging tube extending through the container for discharging the contents of the said container.

In testimony whereof, I affix my signature in the presence of two witnesses.

ALBERT E. ALLEN.

Witnesses:
  H. Sperbeck,
  A. D. Chisholm.